(No Model.)  2 Sheets—Sheet 1.
J. E. SCHLIEPER.
FEED WATER HEATER.
No. 545,660. Patented Sept. 3, 1895.
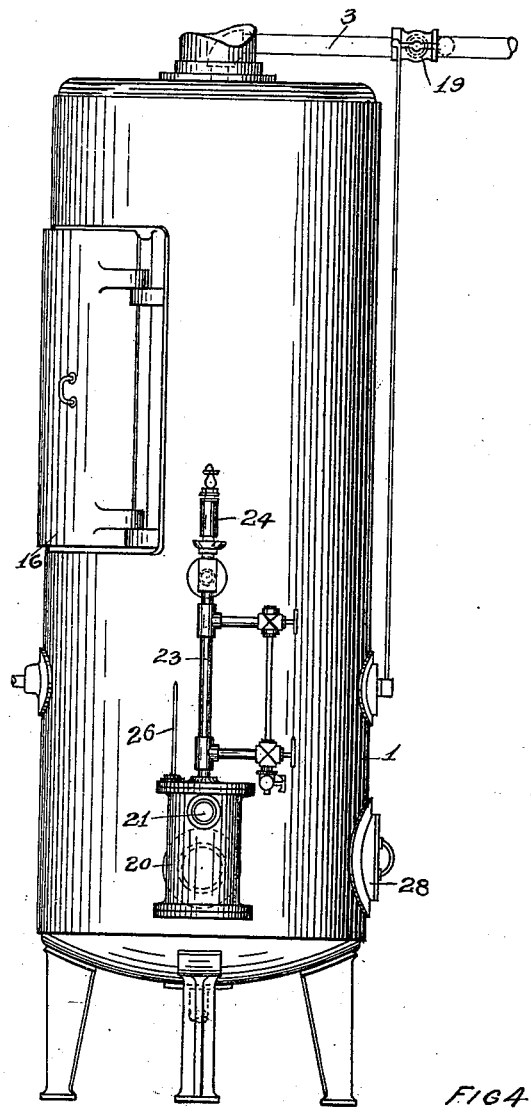
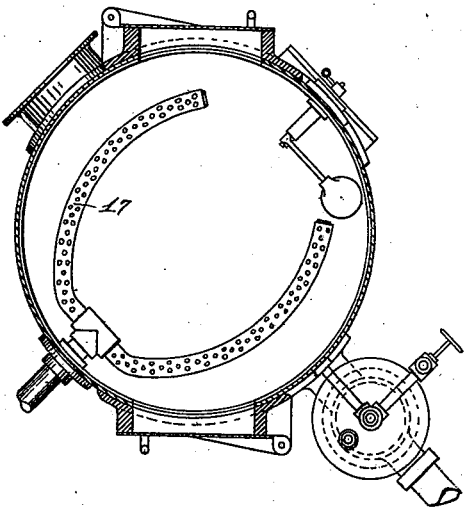
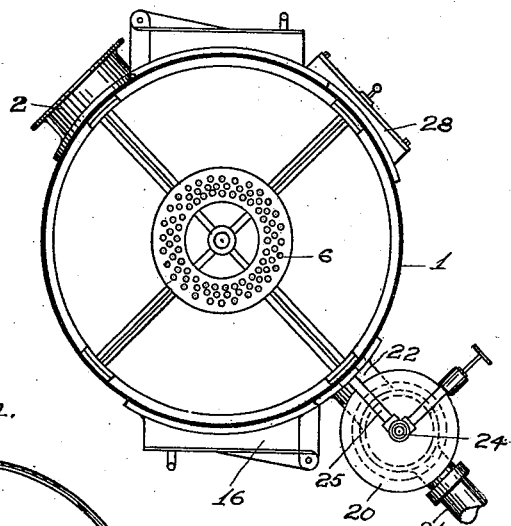
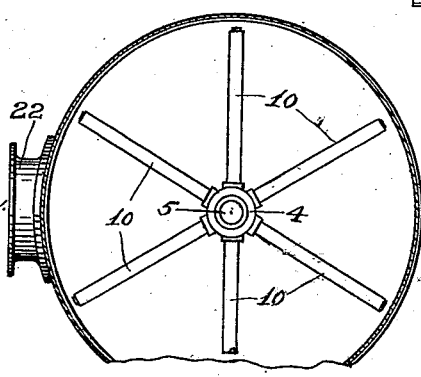
WITNESSES:
William J. Brown
C. A. Williams
INVENTOR
John Edward Schlieper
BY John H. Roney
his
ATTORNEY.

(No Model.) 2 Sheets—Sheet 2.

J. E. SCHLIEPER.
FEED WATER HEATER.

No. 545,660. Patented Sept. 3, 1895.

WITNESSES:
William J. Brown
C. A. Williams

INVENTOR
John Edward Schlieper
BY John H. Roney
his ATTORNEY.

UNITED STATES PATENT OFFICE.

JOHN EDWARD SCHLIEPER, OF ALLEGHENY, PENNSYLVANIA.

FEED-WATER HEATER.

SPECIFICATION forming part of Letters Patent No. 545,660, dated September 3, 1895.

Application filed May 21, 1895. Serial No. 550,033. (No model.)

*To all whom it may concern:*

Be it known that I, JOHN EDWARD SCHLIEPER, a citizen of the United States, residing at Allegheny, in the county of Allegheny and State of Pennsylvania, have invented certain new and useful Improvements in Feed-Water Heaters; and I do hereby declare the following to be a full, clear, and exact description of the invention, such as will enable others skilled in the art to which it pertains to make and use the same, reference being had to the accompanying drawings, which form a part of this specification, in which—

Figure 5:
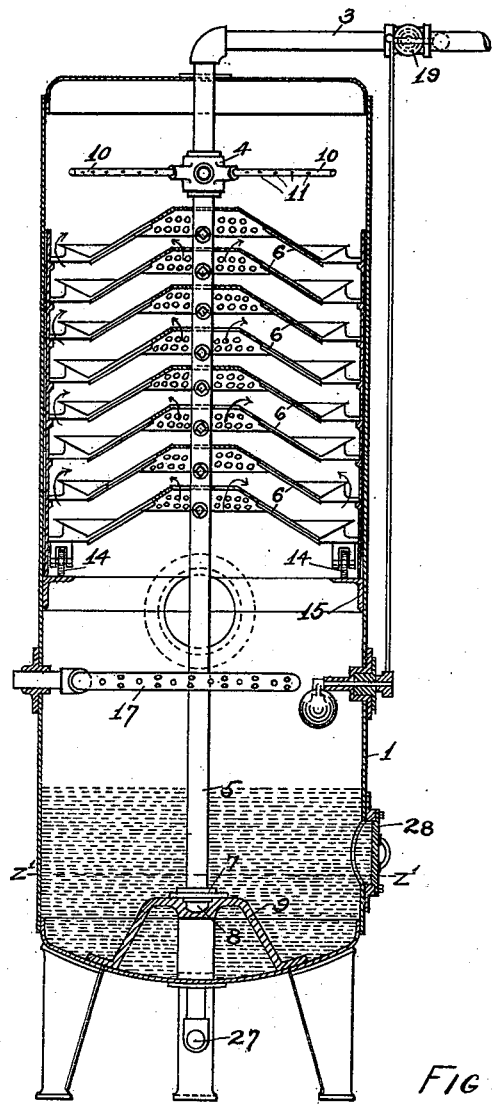
Figure 6:
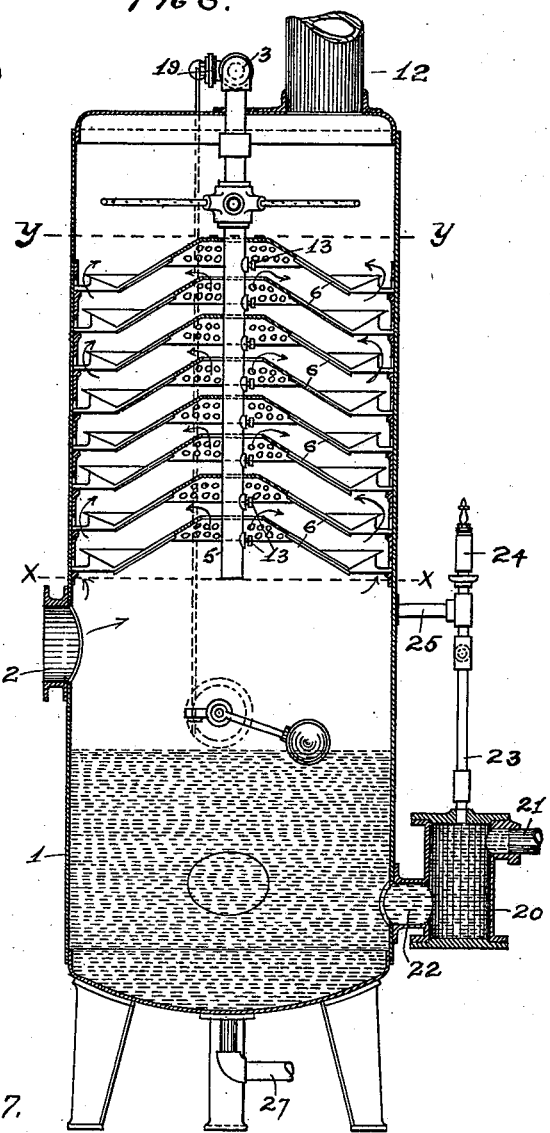
Figure 7:
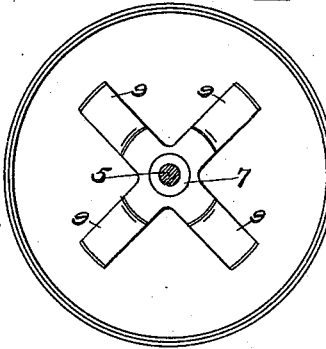

Figure 1 indicates an elevation of my improved feed-water heater. Fig. 2 is a horizontal section through line $xx$ of Figs. 1 and 6. Fig. 3 is the same on line $yy$ of Figs. 1 and 6. Fig. 4 is a plan view of radial supply-pipe. Fig. 5 is a vertical central section of heater. Fig. 6 is a vertical section on line $zz$ of Fig. 1. Fig. 7 is a horizontal section on line $z'z'$ of Fig. 5, showing plan also of standard-carrying bearings for the rod 5.

My invention relates to feed-water heaters of the general character shown in Letters Patent No. 536,660, issued to me the 2d day of April, 1895, the device herein claimed being an improvement thereon.

I will now describe my invention, referring to the drawings forming part hereof, in which the same reference-numerals indicate similar parts wherever they occur.

Referring to said drawings, 1 is a shell or case, vertical and cylindrical in form, connected with a steam-engine (not shown) by the pipe 2, which enters the side of said shell for the purpose of admitting exhaust-steam into said shell or feed-water heater, as hereinafter described.

The water-supply pipe 3 enters the top of said shell and may, as shown in Fig. 5, terminate in the top of the socket 4, which is rigidly secured to the lower end of said supply-pipe.

The upper end of the rod 5 projects through orifices formed in the center of a series of pans 6 6 and terminates in a plug 7, which is seated in a bearing or recess 8, formed in the center of the standard 9, which is secured upon the bottom of said shell, being revolubly secured in the lower end of said socket. Said socket 4 is provided with a number of radial pipes 10 10, which are provided with a series of perforations 11 11, so as to permit water passing through said supply-pipe and said radial arms to descend in a spray upon the series of pans 6 6, which are located in said shell beneath said spray and above the plane of the steam-supply pipe 2 in a series of one above the other, being, as shown in the drawings, preferably somewhat dished in cross-section, so as to permit the water to accumulate in the various pans before it drips or descends upon the next succeeding pan. Every alternate pan is provided with a series of perforations, so as to compel steam entering pipe 2 to pass through the perforations in the lower pan and between the same, and the next succeeding pan to pass thence over the second pan and below the bottom of the third pan, and so on to the top, heating the water on the various pans on its passage, and to make its exit to the atmosphere through pipe 12 of equal size with that of the steam-supply pipe 2, so as to prevent steam-pressure within said shell. Said series of pans is affixed or fastened to rod or pipe 5 by means of set-screws 13 13. The lower pan of said series is mounted upon wheels or casters 14 14, which are mounted upon a bracket 15, which is secured upon the inner side of said shell and extends circumferntially around the same, so as to enable said pans to be rotated or moved upon said casters and pipe or bar 5 when it is desirable to clean said pans by bringing every part of the same opposite the large door 16 in the front of said shell. Below said pans and at high-water level, I locate a strainer 17, which in plan view resembles a horseshoe and is provided with numerous perforations, so as to strain the water in said heater of grease or oil on the surface of the same and to discharge the same through pipe 18, connected with said strainer and passing through the side of said shell. I also locate a swimmer at high-water line in said heater, which controls a valve 19 in said supply-pipe, adapted to close the same when the water is at high line or level and to open the same when the water is below the high level. Connected to said heater below the low-water line therein is a chamber 20, placed intermediate said heater, and a pump (not shown) to supply water to boilers. (Not shown.) Said chamber is exceedingly small as compared with said heater, and is connected with said pump by the pipe 21 and with the heater by the pipe 22. The said last-mentioned pipe 22 is below the water-line in said heater and below the plane of said pipe 21, which connects said chamber with a pump for the purpose of maintaining the same water-level in the chamber and heater and preventing the introduction of oil or other impurities on the surface of the water in said heater into said chamber from which the pump is supplied. Said pipe 22 connecting the heater and chamber is made larger in diameter than the pipe connecting the chamber and the pump for the purpose of preventing suction or draft upon the water in the heater. The comparatively small size of the chamber and the relative position of the same to the heater and the pump, permits but a small quantity of the highly-heated water from being withdrawn from the heater before use in the boilers, and in consequence the water fed through the pump is of the same temperature as that contained in the heater. In the event of said heater being closed at the top instead of open, as shown, the top of said chamber may be provided with a pipe 23, the upper end of which is a steam-alarm 24, which is connected with the heater by the short horizontal pipe 25, whereby when the steam becomes excessive in said heater said alarm is operated. Said chamber 20 is provided with a thermometer 26, the lower end of which projects in the water contained in said chamber, whereby the temperature may be determined. In the bottom of said heater I locate a discharge-pipe 27, and it is also provided with a manhole 28 to permit access thereto.

In Fig. 6 the pipe or rod 5 is shortened and terminates on the same horizontal plane as the lower pan.

Having described my invention, what I claim, and desire to secure by Letters Patent, is—

1. In a feed water heater, the combination of a shell having a series of pans, every alternate one of which is provided with an opening or perforation in the center thereof; a spray, a water supply pipe connected therewith; a vertical pipe or rod revolubly secured to the lower end of said spray and rigidly connected with said pans, whereby said pans may be turned with said bar or pipe; and a chamber between said heater and a pump and connected therewith, the channel connecting the heater and said chamber being larger than that connecting said chamber and pump, and below the plane of the same, and below the low water line in said heater, substantially as described.

2. In a feed water heater, the combination of a shell having a series of pans, every alternate one of which is provided with an opening or perforation in the center thereof; a spray, a water supply pipe connected therewith; a vertical pipe or rod revolubly secured to the lower end of said spray and rigidly connected with said pans, whereby said pans may be turned with said bar or pipe; and a chamber between said heater and a pump and connected therewith, the channel connecting said heater and said chamber being larger than that connecting said chamber and pump, and below the plane of the same, and below the low water line in said heater; a strainer located at the high water level in said heater; and a swimmer connected with and adapted to control a valve in said water supply pipe, substantially as described.

In testimony that I claim the foregoing I hereunto affix my signature this 29th day of April, A. D. 1895.

JOHN EDWARD SCHLIEPER. [L. S.]

In presence of—
JAS. J. MCAFEE,
C. A. WILLIAMS.